United States Patent [19]

D'Achille et al.

[11] 4,022,744

[45] May 10, 1977

[54] CONTINUOUS POLYMERIZATION PROCESS IN EMULSION

[75] Inventors: Massimo D'Achille; Mario Bucci, both of Domodossola (Novara), Italy

[73] Assignee: Montedison Fibre S.p.A., Milan, Italy

[22] Filed: Dec. 8, 1975

[21] Appl. No.: 638,744

[30] Foreign Application Priority Data

Dec. 10, 1974 Italy .................................. 30363/74

[52] U.S. Cl. ...................... 260/29.6 R; 260/29.6 B
[51] Int. Cl.² ........................................ C08L 31/04
[58] Field of Search ................. 260/29.6 B, 29.6 H, 260/29.6 R; 23/288 R; 526/65, 88

[56] References Cited

UNITED STATES PATENTS

| 2,587,562 | 2/1952 | Wilson | 260/89.1 |
| 2,936,303 | 5/1960 | Goins | 526/65 |
| 3,407,046 | 10/1968 | Massoubre | 526/65 |

FOREIGN PATENTS OR APPLICATIONS

| 652,607 | 2/1965 | Belgium | 526/65 |

*Primary Examiner*—M. J. Welsh
*Attorney, Agent, or Firm*—George B. Finnegan, Jr.; Jerome G. Lee; Rocco S. Barrese

[57] ABSTRACT

An improved process for the continuous polymerization, in aqueous emulsion, of vinyl and/or vinylidene monomers is provided, the improvement comprising carrying out the polymerization in a series of reactors arranged in cascade and feeding the reaction mixture from the reactor at the lowest level to the reactor at the highest level.

3 Claims, 1 Drawing Figure

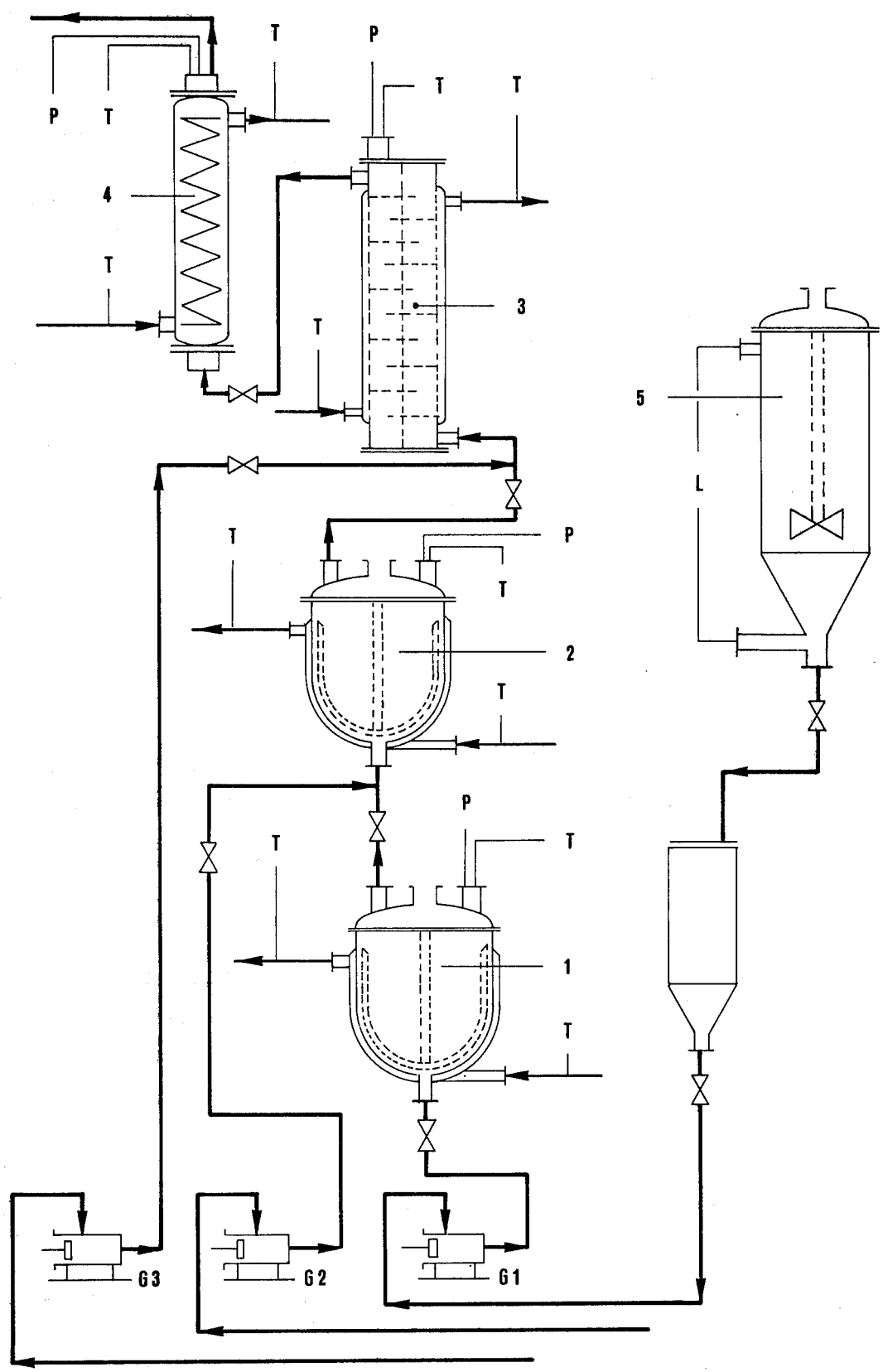

CONTINUOUS POLYMERIZATION PROCESS IN EMULSION

BACKGROUND OF THE INVENTION

This invention relates to a process for polymerizing, in an aqueous emulsion, ethylenically unsaturated monomers having the group $CH_2=C<$, such as, for example, vinyl acetate.

More particularly, this invention relates to a process for continuously polymerizing such monomers, which, on the one hand, does not exhibit the shortcomings of the processes of the prior art that will be described hereinafter, and, on the other hand, provides aqueous dispersions of polymers having constant analytical and chemical-physical characteristics.

It is known that aqueous dispersions of polymers of ethylenically unsaturated monomers can be prepared according to either a discontinuous (i.e., batchwise) or a continuous process.

In the commerical production of such dispersions by means of the discontinuous process, it is generally necessary to employ very large batches of materials which present difficulties, such as that of keeping a certain uniformity of the product among the large batches of materials and that of maintaining the temperature required by the process, the latter difficulty being the greater, the larger the volume of the equipment used.

Conversely, the prior art continuous processes allow for easier operating conditions and offer several distinct advantages, such as, for instance, better quality of the product, higher productivity, use of smaller reactors, and lesser expenses, in comparison with operating discontinuously; furthermore, by controlling the process as automatically as possible, products exhibiting a more homogeneous composition can be obtained.

The prior art continuous polymerization processes in emulsion are of two types:

a. wherein the polymerization is conducted in a single reactor, generally cylindrical, in which the various polymerization steps take place in different sections of the reactor; and b. wherein the polymerization is conducted in several reactors connected with one another in series and arranged at heights decreasing from the first reactor to the last one, each of such reactors having to carry out a particular polymerization step.

The processes of type (a) utilize apparatuses equipped with particular devices suited to remove the troubles that may occur during the polymerization, such as the formation of scales on the reactor walls due to the lack of stirring capability or to superheating.

Conversely, the processes of type (b) do not require any special apparatuses. That is, it is enough to utilize two or more conventional reactors connected in series or connected with one another by means of pumps capable of transferring the mass being polymerized or the finished product.

Furthermore, the processes of type (a) do not provide satisfactory results, particularly with regard to the characteristics of the dispersions, which depend upon the particle sizes of the polymer produced. For example, it is a fact that particles exhibiting an extraordinarily large diameter are obtained when a single phase comprising monomer, initiator, surfactant, protecting agent and buffer, is fed to the reactor. A high value of the particles' average diameter results in mechanical instability and low viscosity of the dispersions, thus causing sedimentation and degradation of the final product.

Such shortcomings are generally eliminated by effecting the polymerization according to a process of type (b) and employing a particular distribution technique of the reactants in different polymerization steps, operating with a number of reactors connected in series. Such technique is based on the following operations:

1. Polymerization in a first reactor (seeding pot) of an aqueous pre-emulsion — added continuously and made up of a monomer portion (5 - 20% of the total monomer) and of all the other ingredients (water, initiators, surfactants, buffers, etc.);
2. transferring the resulting dispersion to a second reactor (polymerizing pot), to which the remaining monomer amount (95-80%) is continuously fed;
3. transferring the dispersion from the polymerizing pot to a third reactor (finishing pot), in which the polymerization is completed;
4. discharging the finished product through a cooler, for instance of the plate or coil type.

In accordance with such a technique, a high emulsifier/monomer ratio, like that existing in the first reactor, brings about a "nucleating" step characterized in that several polymerization nuclei form, which subsequently, in the second reactor, give rise to real polymer particles having a relatively small diameter. In fact, since operative conditions in the polymerizing pot are different and the surfactant/monomer ratio is lower, it is impossible to cause the formation of new nuclei, but only to cause them to grow due to the presence of larger amounts of monomers.

If the feeding conditions in the first two reactors are kept constant, a steady state is attained, i.e., a reaction condition is attained in which the composition of the reacting mixture remains constant, as long as the feeding of the various components and the composition of the resulting mixture, the level of the reacting masses in the various reactors and the discharge of the final product — which in this way assumes a well-defined and homogeneous composition in the long run — remain constant.

The continuous emulsion polymerization of ethylenically unsaturated monomers in several reactors connected in series is described in Italian Pat. No. 366,073 (I. G. Farbenindustrie) and in U.S. Pat. No. 2,587,562 (Shawinigan Resins Corp.). Furthermore, Belgian Pat. No. 652,607 (Shell Internationale Research Maatschappij) describes a particular process of this type, in which the first polymerization step is conducted by keeping a high emulsifier/monomer ratio with a view towards promoting nucleation.

In these processes of type (b) described in the above-mentioned patents, the transfer of the reaction mixture from one reactor to the other occurs through overflow devices proceeding from the reactor located at the highest level to the one located at the lowest level. This technique results in serious problems. In particular, by operating in this way, the mass subjected to polymerization usually takes up a more or less considerable fraction of the volume of each reactor depending upon the point of the lateral outlet. Under these conditions, owing to even slight variations in the polymerization kinetics due, for example, to the difficulty of accurately controlling the inside temperatures or the feeding flow rates, foamings and swellings of the reaction mass often occur, which unavoidably cause the forming of hard and thick scales of polymer on the reactor walls over the dispersion withdrawing level, on the reactor dome, near the dispersion outlet, on the inside surface of the conveying pipes and on the non-immersed part of the shaft of each stirrer. The extent of the scales which form may be such as to result in the termination of the operation and other serious problems, such as variation of the final product characteristics, particularly relating to the particle distribution and their diameter size, the viscosity and stability of the dispersion, the conversion of the monomer to polymer, all of these parameters depending upon the residence time of the mass inside the reactor, which necessarily varies due to the phenomena cited hereinbefore, and being further badly affected by local superheatings due to insufficient heat exchange with the outside.

SUMMARY OF THE INVENTION

It has now been surprisingly found that the shortcomings mentioned hereinabove can be reduced or even eliminated by arranging the reactors in cascade and by conveying the reaction mixture flow from the lowest to the highest reactor. In this way each reactor is always kept full and subjected to the hydrostatic pressure of the reactor or reactors arranged immediately above.

BRIEF DESCRIPTION OF THE DRAWING

The sole FIGURE is a schematic illustration depicting a preferred arrangement of the equipment in which the polymerization process of this invention is carried out.

DETAILED DESCRIPTION OF THE INVENTION

According to one embodiment of this invention, polymerization is conducted in the equipment schematically illustrated in the drawing. More particularly, and in reference to the drawing, nucleation occurs in seeding pot 1 and the growing of the particles coming from seeding pot 1 takes place in polymerizing pot 2. In this way, the formation of foam is prevented and, consequently, the formation of scales is prevented, thus insuring the regularity of the polymerization kinetics and the constancy of the analytical and chemicalphysical characteristics of the dispersion.

If, instead of operating at hydrostatic pressure, it is desired to operate at pressures ranging from 3 to 10 atmospheres, such pressures may be obtained by suitably adjusting the opening of the final product outlet valve. By doing so, it is possible to increase the polymerization kinetics, which brings about an increase of the plant unitary capacity without changing the general good characteristics of the dispersion.

A preferred arrangement of equipment, in which the present process may be carried out, is shown in the drawing to consist essentially of three polymerization units, two of which are of conventional shape, equipped with a stirring means and a jacket means for the circulation of thermoregulating fluid. In particular, these conventional shape units are designated by numerals 1 and 2 in the drawing. Unit (1) is herein referred to as a seeding pot and unit (2) is herein referred to as a polymerization pot. Unit (3) is a finishing pot and is shown as a tubular shape vessel having interior baffles. The tubular vessel marked by numeral 4 is equipped with an inside water coil which serves to cool the dispersion. Pumps $G_1$, $G_2$ and $G_3$ are used, respectively, for the feeding of a preliminary emulsion to unit 1, for the feeding of monomer or monomers to unit 2, and for the feeding of initiator solution, if any, to unit 3. Each unit, i.e., 1–4, is equipped with temperature detectors T and a pressure detector P. The unit marked by numeral 5 is used for the preparation of the preliminary emulsion which is fed to unit 1. Unit 5, as shown, is equipped with a stirring means and a fluid level indicator L.

The monomers, polymerizable according to the process of this invention, comprise various liquid or gaseous vinyl or vinylidene compounds or mixtures of the same. Illustrative of these monomers, for example, are vinyl esters of organic acids, such as vinyl acetate, propionate and butyrate; vinyl halides, such as vinyl chloride and bromide; vinylidene halides, such as vinylidene chloride and bromide; aromatic olefins, such as styrene and alpha-methyl-styrene; alkyl-vinyl-ketones; acids containing optionally substituted vinyl groups or esters of same, such as acrylic or methacrylic acid and their esters. The process of this invention also encompasses the copolymerization of these $CH_2=C<$ monomers with modifying comonomers such as, for example, butyl maleate and crotonic acid.

The surfactants to be employed in the continuous emulsion polymerization of the monomers mentioned hereinabove may be of the anionic, cationic and nonionic type. Illustrative of surfactants belonging to the first group, i.e., anionic, are, for example, salts of alkali metals or of ammonium or of amines and of long-chain fatty acids, such as sodium oleate, potassium stearate, diethanolamine laurate, metal sulfates and sulphonates derived from high molecular weight aliphatic or alkylaromatic hydrocarbons, such as salts of alkylnaphthalene sulphonic acids; metal sulphonates of alkyl esters of dicarboxylic acids, such as the sodium salt of dioctyl succinate sulphonic acid, the sodium salt of diisobutyl naphthalene sulphonic acid, sodium dodecylbenzene sulphonate and sodium laurylsulphate.

Illustrative of surfactants belonging to the second group, i.e., cationic, are, for example, alkyl ammonium salts having a total number of carbon atoms in the alkyls ranging from 12 to 18, such as chlorides and acetates; salts of quaternary ammonium bases, such as bromide of cetyltrimethylammonium.

Surfactants belonging to the third group, i.e., nonionic, are, for example, addition products of higher aliphatic alcohols or higher fatty acids or alkylphenols with ethylene oxide.

For the purposes of this invention, the concentration of the surfactants may vary from 0.1 to 5%, preferably from 0.5 to 2.5%, with respect to the total amount of dispersion.

Protecting agents (thickening agents) which are used in the present process are, for example, polyvinyl alcohols containing up to 10% of acetyl groups, soluble starch, methylcelluloses, hydroxyethyl-celluloses, sodium carboxy-methyl-cellulose and salts of the alginate and polyacrylate type. The concentration of such protecting agents may range from 1 to 10%, preferably from 1 to 3%, with respect to the total amount of dispersion.

Polymerization is conducted with the aid of free radical initiators, such as, for example, potassium persulphate, ammonium persulphate, hydrogen peroxide, dibenzoyl peroxide, sodium peroxide, and diazo compounds. These initiators are employed in amounts ranging between 0.01 and 10%, with respect to the total amount of dispersion.

Examples of suitable buffers also employed in the present process are alkali metal bicarbonates, sodium acetate, borax and acid phosphates of alkali metals.

By employing the above-described aqueous emulsion polymerization process in accordance with this invention, it is possible to continuously prepare aqueous dispersions of polymers and copolymers having particularly desirable morphological characteristics, such as rather reduced particle diameter, good mechanical stability, good stability for extended periods, medium viscosity (2,000 – 5,000 cps.) and a solids content ranging from 40 to 60%.

The dispersions prepared in accordance with this invention are particularly useful as coatings.

In order that those skilled in the art may better understand how to practice the present invention, the following examples are given by way of illustration and not by way of limitation.

EXAMPLE 1

Preparation of the batches a. The aqueous phase to be fed to reactor 1 was prepared by stirring the following components in tank 5 until a stable milk-like white preliminary emulsion was obtained:

| | |
|---|---|
| water | 24.401 kg |
| Alarsol SCL (Montedison) at 83% (sodium dodecylbenzene-sulphonate) | 0.102 kg |
| Natrosol 250HR (Hercules Inc.) at 96% (hydroxyethylcellulose) | 0.256 kg |
| Emulson 0 (Montedison) (polyoxy-ethylated fatty alcohol) | 0.514 kg |
| sodium vinylsulphonate in aqueous solution at 25% (comonomer-surfactant) | 0.474 kg |
| potassium persulphate | 0.075 kg |
| sodium acetate | 0.083 kg |
| vinyl acetate | 5.031 kg | b. For the feeding of polymerizing pot 2, 20.126 kg of vinyl acetate were weighed.

c. For the feeding of finishing pot 3, the following solution was prepared:

| | |
|---|---|
| potassium persulphate | 0.012 kg |
| water | 0.250 kg |

Procedure

The various reactors, including the cooling unit 4, were disconnected from one another by closing the proper valves.

Seeding pot 1, made of stainless steel and having a capacity of 11 liters, was connected with a reflux condenser and then filled with a portion of the preliminary emulsion prepared under (a). Under stirring at 100 rpm, the temperature of the water circulating in the jacket was gradually brought to 78°-80° C and, once the reflux had begun, polymerization was allowed to terminate, which was indicated by the complete termination of said reflux.

Stainless steel polymerization pot 2, having a capacity of 11 liters, was connected with a reflux condenser and then was filled with the following batch:

| | |
|---|---|
| water | 5.355 kg |
| Alarsol SCL | 0.021 kg |
| Natrosol 250 HR | 0.055 kg |
| Emulson 0 | 0.108 kg |
| sodium vinylsulphonate in a 25% aqueous solution | 0.100 kg |
| potassium persulphate | 0.021 kg |
| sodium acetate | 0.035 kg |
| vinyl acetate | 5.305 kg |

Starting therefrom, a polyvinyl acetate dispersion was prepared by stirring at 100 rpm and heating to reflux temperature until completion.

The reflux condensers utilized for starting the process were disconnected, whereupon, by opening the proper valves, the seeding pot, polymerizing pot, finishing pot and cooler were connected with one another, the last two apparatuses having been previously filled with the polyvinyl acetate dispersion at 50% of dry matter, previously prepared. Utilizing the metering pump G1, the preliminary emulsion prepared according to (a) was continuously fed to 1, kept under stirring at 100 rpm, while the prepolymerized product was discharged into 2 at the same rate at which the preliminary emulsion was charged. Polymerizing pot 2, stirred at 100 rpm, was further fed utilizing the metering pump G2 with vinyl acetate at a ratio of 3.813 kg for each 1,006 kg of vinyl acetate contained in the prepolymerized product coming from 1.

Stainless steel finishing pot 3, having a capacity of 11 liters, was continuously fed by pump G3 with 0.050 kg — for each 10 kg of dispersion coming from 2 — of potassium persulphate solution, in order to convert the last traces of monomer. In the equilibrium stage, the feedings were as follows:

| | | | |
|---|---|---|---|
| Reactor 1 : | 6.187 | kg/h | of preliminary emulsion |
| Reactor 2 : | 6.187 + | " | of pre-polymerized product coming from 1 |
| " | 3.813 | " | of vinyl acetate |
| Reactor 3 : | 0.050 + | " | of potassium persulphate solution |
| " | 10.000 | " | of polymeric dispersion coming from 2. |

The resulting capacity, in reference to the total volume of the three polymerization units (33 liters) was equal to 0.305 kg/l/h.

For larger capacities, of course, the amounts fed to 1, 2 and 3 can be increased correspondingly.

The temperatures in the various reactors were kept as follows:

Reactor 1 = 75 ± 2° C
Reactor 2 = 85 ± 2° C
Reactor 3 = 90 ± 2° C.

From finishing pot 3, the dispersion was transferred into cooler 4, wherefrom it was conveyed to the storage tanks or directly to utilization.

A stable dispersion having a dry matter content of about 50% and a final residual monomer not exceeding 0.5% was thus obtained. The dispersion exhibited good chemical and mechanical stabilities; after several hours of operation, the sizes of the particles reached an equilibrium value corresponding to an average diameter of 1.0 – 1.5 $\mu$.

EXAMPLE 2

For illustration of an operation to be carried out under pressure, a preliminary emulsion to be fed to reactor 1 was prepared by stirring, in tank 5, the following components:

| | |
|---|---|
| water | 21.734 kg |
| Alarsol SCL | 0.112 kg |
| Natrosol 250 HR | 0.280 kg |
| Emulson 0 | 0.562 kg |
| sodium vinylsulphonate in a 25% aqueous solution | 0.518 kg |
| potassium persulphate | 0.082 kg |
| sodium acetate | 0.090 kg |
| vinyl acetate | 5.498 kg |

The whole cycle, with the exception of seeding pot 1, was filled with the finished dispersion having the same characteristics as the dispersion to be obtained.

11 kg of the preliminary emulsion prepared as described hereinabove, were fed to reactor 1 by means of feeding pump G1 and were polymerized under stirring (100 rpm) and heating.

After polymerization of such a charge, the seeding pot was connected with the polymerizing pot, kept at 85° C, and with the finishing pot, kept at 90° C. In the equilibrium stage, the feed amounts were as follows:

| Reactor 1 : | 14.250 | kg/h of preliminary emulsion |
|---|---|---|
| Reactor 2 : | 14.150 + | kg/h of pre-polymerized product coming from 1 |
| " | 10.750 | kg/h of vinyl acetate |
| Reactor 3 : | 25.000 | kg/h of polymeric dispersion coming from 2. |

The resultant capacity was equal to 0.758 kg/1/h. The amounts fed to the abovesaid reactors can be proportionally increased or reduced as the plant capacity varies. The present example differs from Example 1 in that the catalyst amount was reduced by eliminating the addition of the same to reactor 3; it was operated at a pressure of 3 - 4 atm., thus obtaining a dispersion having a dry matter content of about 56%. The dispersion so prepared is like that of Example 1, but characterized by a reduced average diameter of the particles ( ≤ 1 $\mu$), by a higher viscosity, and by a residual monomer not exceeding 0.3%.

Still more evident results concerning the equipment efficiency and conditions were obtained after runs of several days. In fact, neither swellings nor foaming of the masses under polymerization could be noticed; the scales in the various reactors were in allowable amounts, if one considers the polymerization time.

EXAMPLE 3

The following mixtures and solutions were prepared:

| | |
|---|---|
| Mixture No. 1 | |
| water | 29.460 kg |
| Natrosol 180 L (Hercules Inc.) at 96% (hydroxyethylcellulose) | 0.410 kg |
| Alarsol SCL | 0.230 kg |
| Rioklen NF 10 (Montedison) (polyoxyethylated nonylphenol) | 0.399 kg |
| sodium acetate | 0.350 kg |
| sodium vinylsulphonate in a 25% aqueous solution | 0.476 kg |
| crotonic acid (modifying comonomer) | 0.195 kg |
| Mixture No. 2 | |
| vinyl acetate | 26.123 kg |
| butyl maleate | 11.628 kg |
| Solution No. 1 | |
| water | 9.700 kg |
| potassium persulphate | 0.300 kg |

The following aqueous phase was prepared for reactor 1 by pre-emulsifying:

| | |
|---|---|
| mixture No. 1 | 23.398 kg |
| solution No. 1 | 2.940 kg |
| vinyl acetate | 0.720 kg |
| "Rhodorsil antimousse 426" (anti-foaming) silicon oil manufactured by Rhone-Poulenc) | 0.015 kg |

The seeding pot was filled with the aqueous phase prepared as described above and polymerization was carried out, while stirring (100 rpm) and heating to reflux temperature by causing hot water at 75°–80° C to circulate in the jacket, after having connected the reactor with a reflux condenser and having isolated it from the other tanks arranged above.

At the conclusion of polymerization, the condenser was disconnected, reactor 1 was connected with reactors 2, 3 and cooler 4, previously filled with a copolymeric dispersion having characteristics similar to the one to be obtained (either prepared through a discontinuous process or coming from a preceding continuous operation).

The process was operated under regular conditions using the following feed amounts:

| Reactor 1 : | 2.330 | kg/h | of pre-emulsified aqueous phase |
|---|---|---|---|
| Reactor 2 : | 2.330 + | " | of pre-polymerized product coming from 1 |
| " | 2.424 | " | of mixture No. 2 |
| Reactor 3 : | 4.754 + | " | of copolymeric dispersion coming from 2 |
| " | 0.250 | " | of solution No. 1 (potassium persulphate at 3%) |

The temperature was kept at the following values:
Reactor 1 = 75±2° C,
Reactor 2 = 85±2° C,
Reactor 3 = 90±2° C.

The capacity was equal to 0.152 kg/1/h.

A stable suspension was thus obtained having a dry matter content of about 52% and an average diameter of the particles of 1.0 – 1.5$\mu$.

Light, transparent, plastic and sufficiently water-resistant films were obtained from the dispersion by drying.

Obviously, other modifications and variations of the present invention are possible in the light of the above teachings. It is therefore to be understood that changes may be made in the particular embodiments of this invention which are within the full intended scope of the invention as defined by the appended claims.

What is desired to be secured by Letters Patent is:

1. In a process for the continuous polymerization, in aqueous emulsion, of monomers having one $CH_2=C<$ group comprising reacting said monomers in the presence of water, initiators, surfactants and buffers in a series of reactors, each reactor carrying out a selected polymerization step, the improvement comprising having the reactors arranged in cascade and feeding the reaction mixture from the reactor at the lowest level to the reactor at the highest level.

2. The process according to claim 1, wherein said monomer having the group $CH_2=C<$ is vinyl acetate.

3. The process according to claim 1 wherein said monomer having the group $CH_2=C<$ is a mixture of vinyl acetate and butyl maleate.

* * * * *